United States Patent [19]
Smith et al.

[11] Patent Number: 5,970,786
[45] Date of Patent: Oct. 26, 1999

[54] METHOD FOR MEASURING COMPRESSED NATURAL GAS

[76] Inventors: Robert S. Smith, 1903 Triple Oak Ct., Houston, Tex. 77077; Igor Krasnov, 6835 Oakwood Trace Ct., Houston, Tex. 77040

[21] Appl. No.: 08/937,866

[22] Filed: Sep. 25, 1997

[51] Int. Cl.⁶ .............................. G01F 17/00; B65B 31/00
[52] U.S. Cl. .................................... 73/149; 141/4
[58] Field of Search ................. 73/149, 861.01, 73/861.02, 708; 137/7, 12; 222/1; 141/4

[56] References Cited

U.S. PATENT DOCUMENTS

| | | | |
|---|---|---|---|
| 4,527,600 | 7/1985 | Fisher et al. | 141/4 |
| 4,956,996 | 9/1990 | Morris | 73/149 |
| 5,628,349 | 5/1997 | Diggins et al. | 141/3 |

Primary Examiner—Max Noori
Assistant Examiner—Abdullahi Aw-Musse
Attorney, Agent, or Firm—James E. Bradley

[57] ABSTRACT

A compressed natural gas (CNG) vehicle refueling system is designed for refueling fleets of vehicles with identical fuel tanks. The amount of CNG dispensed into the tanks may be closely approximated without the use of a flow meter. An initial standardized volume is calculated based upon the ambient temperature, the initial pressure level and an approximate compressibility of the gas. Gas is dispensed into the fuel tank to a desired pressure which is confirmed with a pressure gage. A final standardized volume of gas contained within the fuel tank is calculated based upon the final pressure level and assuming no change in the compressibility of the gas. The initial standardized volume of gas is subtracted from the final standardized volume of gas to yield an actual volume of gas dispensed from the storage vessel. Empirically derived temperature correction factors may be used to generate an even more accurate approximation of CNG dispensed. The temperature correction factors compensate for the difference in temperature between operating temperatures and the standardized temperature of zero degrees celsius.

4 Claims, 2 Drawing Sheets

METHOD FOR MEASURING COMPRESSED NATURAL GAS

TECHNICAL FIELD

This invention relates in general to natural gas refueling systems and in particular to methods for measuring the amount of compressed natural gas dispensed from a storage vessel.

BACKGROUND ART

Compressed natural gas (CNG) vehicles require specialized refueling delivery systems. One such system utilizes high pressure storage vessels which are delivered full to a dispensing or filling station on shuttle trucks. A hose from the storage vessel is connected to the tank on the vehicle to be refueled, allowing CNG to flow from the storage vessel to the tank. A high pressure device, such as a compressor, applies pressure to the vessels as the CNG fuel flows to the vehicles. The high pressure device is required to compensate for pressure drops in the vessels resulting from dispensing the CNG.

The amount of CNG dispensed from the vessels is typically measured by a flow meter. Various types of flow meters are used by the industry including sonic nozzles, coriolis tubes and turbine-type flow meters. Each of these flow meters is expensive and represents a significant portion of the cost of the dispensing system. An accurate, less expensive method for measuring the amount of CNG dispensed is needed.

DISCLOSURE OF THE INVENTION

A compressed natural gas (CNG) vehicle refueling system is designed for refueling fleets of vehicles with identical fuel tanks. The amount of CNG dispensed into the tanks may be closely approximated without the use of a flow meter. An initial standardized volume is calculated based upon the ambient temperature, the initial pressure level and an approximate compressibility of the gas. Gas is dispensed into the fuel tank to a desired pressure which is confirmed with a pressure gage. A final standardized volume of gas contained within the fuel tank is calculated based upon the final pressure level and assuming no change in the compressibility of the gas. The initial standardized volume of gas is subtracted from the final standardized volume of gas to yield an actual volume of gas dispensed from the storage vessel. Empirically derived temperature correction factors may be used to generate an even more accurate approximation of CNG dispensed. The temperature correction factors compensate for the difference in temperature between operating temperatures and the standardized temperature of zero degrees celsius.

BEST MODE FOR CARRYING OUT THE INVENTION

Figure 1:
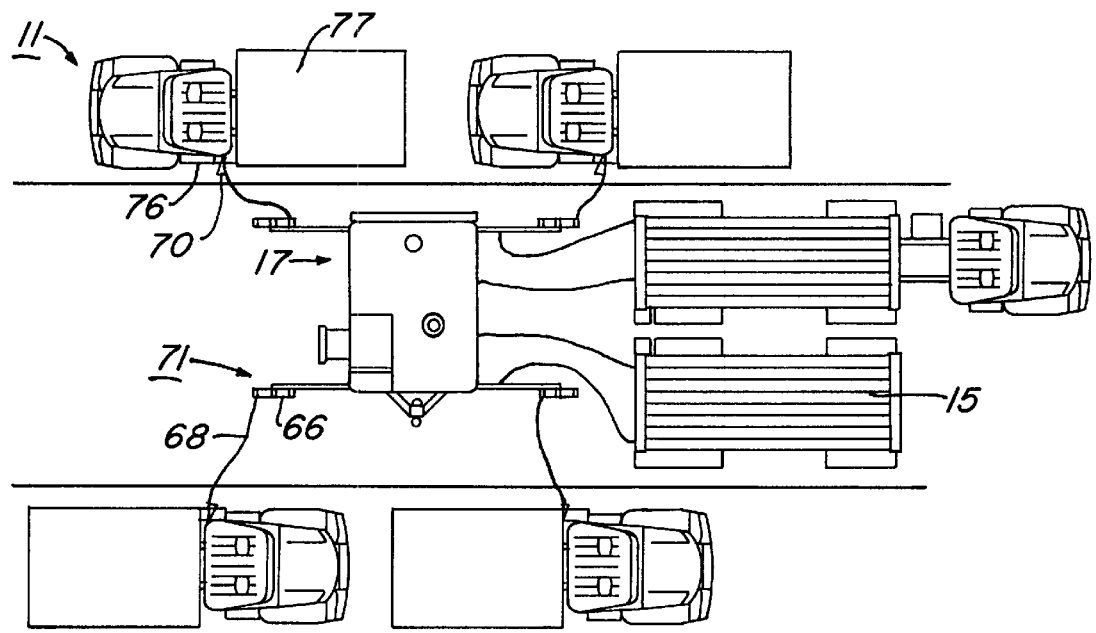
FIG. 1 is a schematic drawing of a CNG refueling system.

Referring to FIG. 1, a compressed natural gas (CNG) vehicle refueling system 11 is shown. Refueling system 11 has a pressurized storage vessel 15 which supplies CNG to a refueling section 17. Refueling section 17 has a plurality of refueling depots 71, each of which can refuel one vehicle 77 at a time. Each refueling depot 71 has a user-operated dispensing valve 66, a flexible hose 68 and a nozzle 70 for engaging the fuel tank 76 of the vehicle 77 to be refueled. One vehicle 77 can be refueled at each fuel depot 71 simultaneously. When refueling is completed, control valve 66 is closed and nozzle 70 is disconnected from tank 76.

In the preferred embodiment, refueling system 11 is designed to be used with a fleet of vehicles 77 having identical fuel tanks 76 with equal water volumes. In this specification, the term "water volume" is used to mean the volume of water a tank 76 will hold, assuming that water is incompressible. Fuel tanks 76, their plumbing (not shown), and their location on vehicles 77 are preferably identical in every way so as to eliminate variables which might affect physical parameters such as temperature or pressure during refueling. For example, during refueling the CNG expands and cools as it travels and is delivered through system 11 and the plumbing of vehicles 77. This natural cooling effect will lower the temperature of the gas. The amount of cooling will vary if the plumbing is not the same for each vehicle 77. Conversely, the gas is reheated as it is compressed within tanks 76 during refueling. If tanks 76 are not identical, the temperature increase will be inconsistent. Thus, the precision and accuracy of system 11 will depend in part upon the consistency of the hardware utilized.

Figure 3:
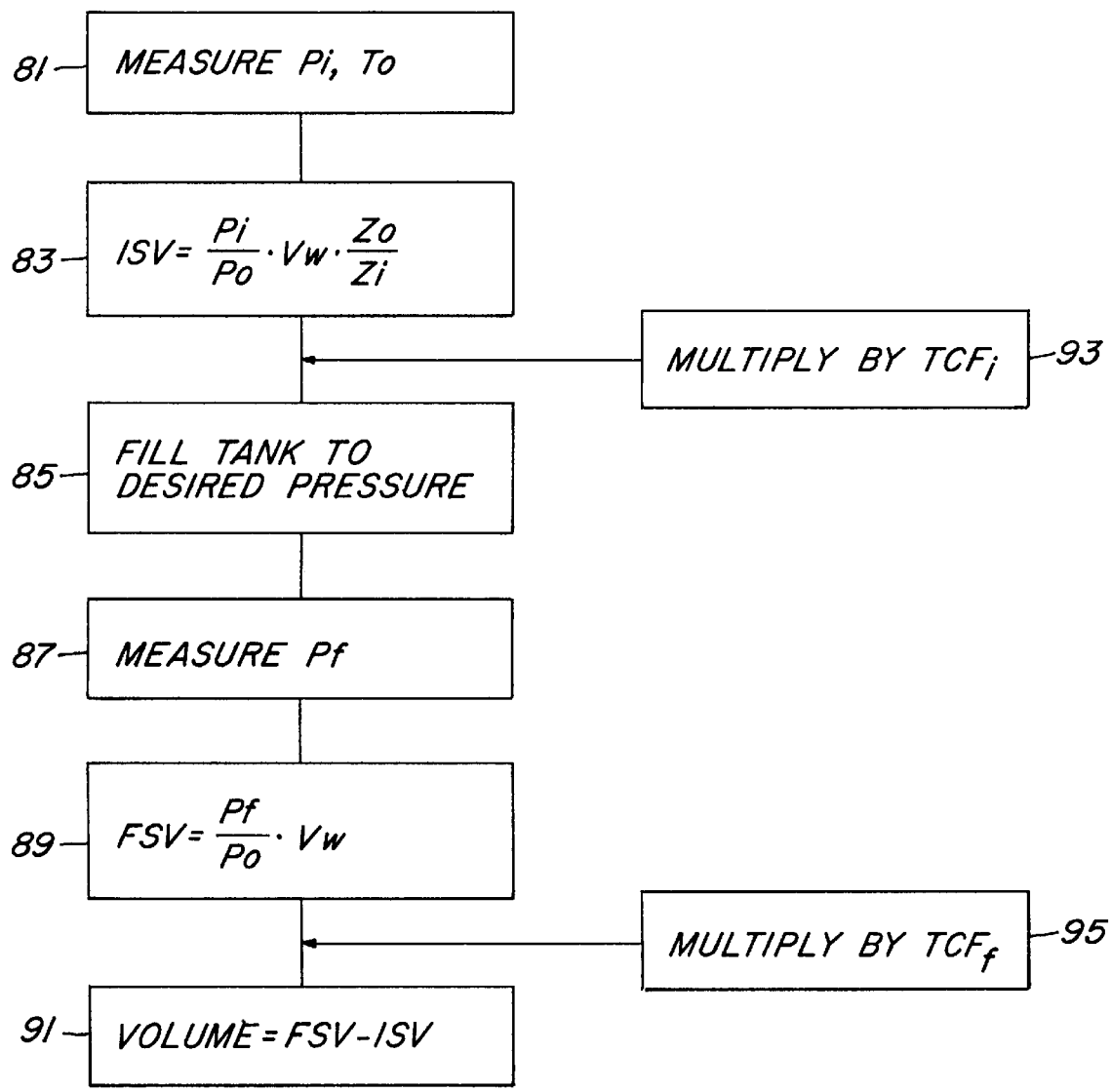
FIG. 3 is a flowchart of the steps of the operation according to the invention.

The amount of CNG dispensed into tank 76 may be approximated with the following steps (FIG. 3). The initial pressure (Pi) 81 of tank 76 is measured. An initial standardized volume (ISV) 83 of CNG contained within tank 76 is calculated by dividing the initial pressure (Pi) by standard atmospheric or sea level pressure (Po) (14.7 psia), multiplying by the water volume of tank 76 (Vw), multiplying by a compressibility factor of the CNG at standard pressure (Zo), and then dividing by a compressibility factor of the CNG at the initial pressure (Zi). Tank 76 is then filled with CNG to a desired pressure 85, preferably 3000 psia. The final pressure level (Pf) is then measured 87 and confirmed. A final standardized volume (FSV) 89 of CNG is calculated by dividing the final pressure level (Pf) by standard pressure (Po) and then multiplying by the water volume of tank 76 (Vw). In the final step, the initial standardized volume (ISV) is subtracted from the final standardized volume (FSV) to yield an approximate volume 91 of CNG dispensed from the storage vessel 15. However, this method fails to compensate for temperature changes of the CNG.

Figure 2:
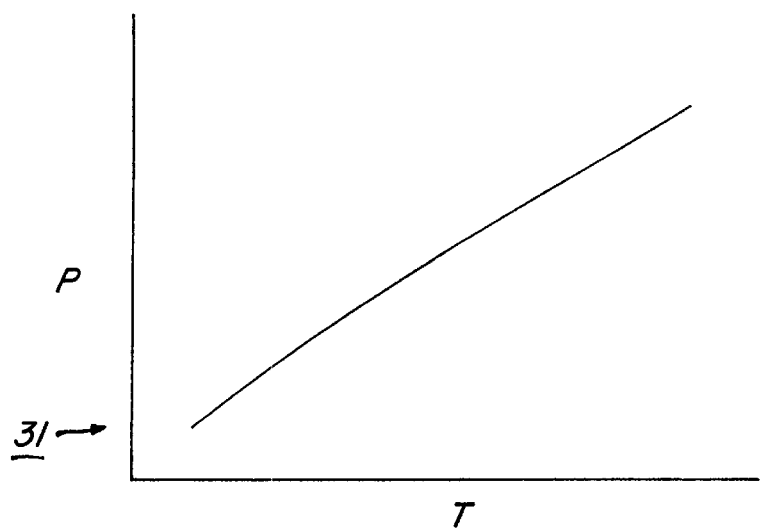
FIG. 2 demonstrates the relationship between pressure and temperature for a given volume of CNG.

Referring to FIG. 2, a graph 31 depicts the relationship between temperature and pressure for a constant amount of CNG. Graph 31 implicitly illustrates that the remaining volume capacity for a partially unfilled tank 76 is a function of the starting or ambient temperature (To) and pressure (Pi) of the CNG it contains. The higher the ambient temperature and pressure, the lower the remaining capacity for tank 76. The relationship depicted in graph 31 may be used to empirically derive a reference table (not shown) of temperature correction factors (TCF). The temperature correction factors are derived by initially filling a tank 76 with CNG to standard atmospheric pressure at zero degrees celsius. Tank 76 is then filled to capacity at 3000 psi with a volume of CNG that is recorded along with a final temperature measurement of the CNG. These initial settings and the volume of CNG required to fill tank 76 are arbitrarily given a temperature correction factor of 1.0. Tank 76 is then drained of CNG to repeat the process at different temperature and pressure settings. The temperature and pressure of CNG in tank 76 are varied over their expected operating ranges. After each variable change, tank 76 is filled to capacity to generate another table figure. The reference table is then entered into a computer database at the dispensing site.

Temperature correction factors may be used to generate an even more accurate approximation of CNG dispensed than the method described above. The temperature correction factors may be used to compensate for the difference in temperature between operating temperatures and the standardized temperature of zero degrees celsius. The ambient temperature (To) surrounding tank 76 will be measured at the time of filling, as indicated in step 81. The initial standardized volume of CNG is calculated in step 83 and then adjusted by multiplying it by the temperature correction factor (step 93) that corresponds to the ambient temperature. The temperature correction factor is determined by a reference table in a computer database. Similarly, the final standardized volume of CNG is calculated in step 89 and then adjusted by multiplying it by the temperature correction factor (step 95) that corresponds to the approximate increase in temperature of the CNG within tank 76 during dispensing step 85. The approximate increase in temperature of the CNG is based upon the figures generated in the empirical derivation described above.

The invention has several advantages. This method does not require expensive flow meters, thereby eliminating a significant portion of the cost of the dispensing system. The invention provides an accurate, less expensive method for measuring the amount of CNG dispensed from a pressurized storage vessel with a known capacity.

While the invention has been shown in only one of its forms, it should be apparent to those skilled in the art that it is not so limited, but is susceptible to various changes without departing from the scope of the invention.

I claim:

1. A method for approximating a volume of compressed natural gas dispensed from a pressurized storage vessel into a fuel tank wherein the water volume of the fuel tank is known, comprising:
   (a) measuring an ambient temperature surrounding the fuel tank;
   (b) measuring an initial pressure level of the fuel tank;
   (c) calculating an initial standardized volume of gas contained within the fuel tank based upon the ambient temperature, the initial pressure level and an approximate compressibility of the gas, and multiplying the initial standardized volume of gas by a temperature correction factor to compensate for the difference in temperature between the ambient temperature and a standardized temperature, wherein the temperature correction factor comprises multiplying the initial standardized volume of gas by an empirically-derived temperature-to-pressure relationship for the gas and the fuel tanks;
   (d) dispensing the gas into the fuel tank to a desired final pressure level;
   (e) calculating a final standardized volume of gas contained within the fuel tank based upon the final pressure level and assuming no change in the compressibility of the gas; and then
   (f) subtracting the initial standardized volume of gas from the final standardized volume of gas to yield an actual volume of gas dispensed from the storage vessel.

2. A method for approximating a volume of compressed natural gas dispensed from a pressurized storage vessel into a fuel tank wherein the water volume of the fuel tank is known, comprising:
   (a) measuring an ambient temperature surrounding the fuel tank;
   (b) measuring an initial pressure level of the fuel tank;
   (c) calculating an initial standardized volume of gas contained within the fuel tank based upon the ambient temperature, the initial pressure level and an approximate compressibility of the gas;
   (d) dispensing the gas into the fuel tank to a desired final pressure level;
   (e) calculating a final standardized volume of gas contained within the fuel tank based upon the final pressure level and assuming no change in the compressibility of the gas, and approximating an increase in temperature of the gas during step (d) based upon the final pressure level and an empirically derived temperature-to-pressure relationship for the gas and the fuel tank; and then
      multiplying the final standardized volume of gas by a temperature correction factor to compensate for the difference in temperature between the approximate increased temperature and a standardized temperature; and then
   (f) subtracting the initial standardized volume of gas from the final standardized volume of gas to yield an actual volume of gas dispensed from the storage vessel.

3. The method of claim 2 wherein the temperature correction factor comprises multiplying the final standardized volume of gas by an empirically-derived temperature-to-pressure relationship for the gas and the fuel tank.

4. A method for approximating the volume of compressed natural gas dispensed from a pressurized storage vessel into a fuel tank wherein the water volume of the fuel tank is known, comprising:
   (a) measuring an ambient temperature surrounding the fuel tank;
   (b) measuring an initial pressure level of the fuel tank;
   (c) calculating an initial standardized volume of gas contained within the fuel tank by dividing the initial pressure by standard sea level pressure, multiplying by the water volume of the fuel tank, multiplying by a compressibility factor of the gas at standard sea level pressure, and then dividing by a compressibility factor of the gas at the initial pressure;
   (d) multiplying the initial standardized volume of gas by an empirically-derived temperature-to-pressure relationship for the gas and the fuel tank to compensate for the difference in temperature between the ambient temperature and a standardized temperature;
   (e) dispensing the gas into the fuel tank to a desired final pressure level;
   (f) approximating an increase in temperature of the gas during step (e) based upon the final pressure level and an empirically derived temperature-to-pressure relationship for the gas and the fuel tank;
   (g) calculating a final standardized volume of gas contained within the fuel tank by dividing the final pressure level by standard sea level pressure and then multiplying by the water volume of the fuel tank;
   (h) multiplying the final standardized volume of gas by an empirically-derived temperature-to-pressure relationship for the gas and the fuel tank to compensate for the difference in temperature between the approximate increased temperature and a standardized temperature; and then
   (i) subtracting the initial standardized volume of gas from step (d) from the final standardized volume from step of gas from step (g) to yield an actual volume of gas dispensed from the storage vessel.

* * * * *